United States Patent
Van Put (10) Patent No.: US 11,113,911 B2
(45) Date of Patent: Sep. 7, 2021

(54) PASSENGER INFORMATION SYSTEM

(71) Applicant: TELEVIC RAIL, Izegem (BE)

(72) Inventor: Ludo Van Put, Eeklo (BE)

(73) Assignee: TELEVIC RAIL, Izegem (BE)

( * ) Notice: Subject to any disclaimer, the term of this patent is extended or adjusted under 35 U.S.C. 154(b) by 0 days.

(21) Appl. No.: 16/630,077

(22) PCT Filed: Jul. 11, 2018

(86) PCT No.: PCT/EP2018/068799
§ 371 (c)(1),
(2) Date: Jan. 10, 2020

(87) PCT Pub. No.: WO2019/011989
PCT Pub. Date: Jan. 17, 2019

(65) Prior Publication Data
US 2020/0151984 A1    May 14, 2020

(30) Foreign Application Priority Data
Jul. 13, 2017 (EP) ..................................... 17181100

(51) Int. Cl.
*G05B 19/042* (2006.01)
*H04W 4/80* (2018.01)
(Continued)

(52) U.S. Cl.
CPC ............... *G07C 9/22* (2020.01); *B61D 19/02* (2013.01); *G05B 19/0423* (2013.01);
(Continued)

(58) Field of Classification Search
CPC ........ B61D 19/02; B61D 41/00; B61D 41/04; G06F 21/34; G06F 21/35; G06F 21/40;
(Continued)

(56) References Cited

U.S. PATENT DOCUMENTS

2006/0085308 A1* 4/2006 Metzger ............... G06Q 10/087
705/34
2006/0174130 A1  8/2006 Noble
(Continued)

OTHER PUBLICATIONS

European Search Report from EP Application No. 17180100.3, dated Oct. 27, 2017.
(Continued)

*Primary Examiner* — Dionne Pendleton
(74) *Attorney, Agent, or Firm* — Workman Nydegger (57) ABSTRACT

A passenger information system, PIS, for a public transport vehicle comprises a public compartment and a restricted compartment. The PIS comprises i) a passenger information terminal for communicating information to users when located in the public compartment; and ii) a first electronic identification device configured to receive an electronic identification from an operator when located in the restricted compartment and to register the electronic identification with the PIS as a registered electronic identification; and iii) an interfacing system comprising inputting means for inputting information into the PIS. A second electronic identification device is configured to receive an electronic identification from a user of the interfacing system. The PIS is arranged to authorize the inputting of information when the electronic identification from the user matches the registered electronic identification.

14 Claims, 4 Drawing Sheets

(51) Int. Cl.
  *G07C 9/22* (2020.01)
  *B61D 19/02* (2006.01)
  *G06F 21/35* (2013.01)
  *G06F 21/40* (2013.01)
  *G07C 9/00* (2020.01)
  *G07C 9/28* (2020.01)
  *H04W 12/06* (2021.01)
  *H04W 12/69* (2021.01)

(52) U.S. Cl.
  CPC .............. *G06F 21/35* (2013.01); *G06F 21/40* (2013.01); *G07C 9/00896* (2013.01); *G07C 9/28* (2020.01); *H04W 12/06* (2013.01); *H04W 12/69* (2021.01)

(58) Field of Classification Search
  CPC . G06F 21/6218; G06F 3/04842; G06Q 50/30; G06Q 20/40; G06Q 10/02; G06Q 10/10; G06Q 30/06; G06Q 50/16; G06Q 50/265; G07C 9/00896; G07C 9/22; G07C 9/257; G07C 9/26; G07C 9/28; G07C 9/00563; G07C 9/00571; G07C 9/37; G07C 5/008; G07C 5/085; G07C 9/00; G08C 17/02; G08C 2201/20; H01M 10/052; H01M 10/0525; H01M 10/48; H01M 2220/20; H04L 63/083; H04L 63/0861; H04L 63/104; H04L 63/105; H04L 63/107; H04L 67/12; H04L 67/125; H04W 12/06; H04W 12/08; H04W 40/244; H04W 4/023; H04W 4/029; H04W 4/40; H04W 4/42; H04W 4/44; H04W 4/48; H04W 4/80; H04W 68/005; Y02E 60/10; Y02T 30/00; B64D 11/0015; G01V 5/0008; G01V 5/0041; G06K 2007/10504; G06K 7/10297; G06K 7/10366; G07B 15/00; G08B 21/182; B60N 2/002; B60N 2/0224; B60N 2/0228; B60N 2/56; B60N 2/90; B60R 11/0229; B60R 11/0252; B60R 16/037; B60R 2011/0012; B60R 25/241; B60W 2530/00; B60W 40/08; B61L 15/0018; B61L 15/0045; B61L 15/0072; B61L 15/009
  See application file for complete search history.

(56) References Cited

U.S. PATENT DOCUMENTS

2011/0082714 A1\* 4/2011 Gaikwad ................ G06Q 10/02
  705/5
2016/0311348 A1\* 10/2016 Watson ............... B60R 11/0229
2020/0370778 A1\* 11/2020 Luckmann ............... F24F 11/80

OTHER PUBLICATIONS

International Search Report and Written Opinion from PCT Application No. PCT/EP2018/068799, dated Oct. 9, 2018.

\* cited by examiner

PASSENGER INFORMATION SYSTEM

FIELD OF THE INVENTION

The present invention generally relates to a passenger information system (PIS).

BACKGROUND OF THE INVENTION

Passenger information systems are widely implemented in public transportation vehicles such as trains, trams, metros and buses. They are used to provide information to passengers that is relevant for their journey. This information is presented to the passenger by information terminals. Such a terminal can be a screen to present the information in a visual way or a speaker to present the information in an audible way.

A passenger information system further comprises an interfacing system for inputting information into the passenger information system. To this respect, it typically features a microphone, a telephone handset, a keyboard or a touch screen. In most public transportation vehicles, the interfacing system is located within the public area of the vehicle, i.e. in a location where passengers are allowed, for example near the entrance doors. This way, an operator has quick and easy access to the passenger information system. In a train for example, the guard or conductor needs to be able to operate the passenger information system from within at least each carriage or passenger car.

To protect the passenger information system from unauthorized use, there is a need for protecting this interfacing system.

A common protection measure is a lockable door such that the interfacing system can only be operated by a user that has the proper key. This key is typically in the form of a skeleton key, more specifically a railway carriage key. Such key has the advantage that an operator of the transport vehicle can use the key on different transport vehicles thereby avoiding the problem of centralized key management. For most public transport vehicles, it is indeed important that the passenger information system can be operated without centralized control and that any authorized person can easily access the information system when entering any of the operated transport vehicles.

A problem with these skeleton keys is that they are available for purchase to the public. Therefore, they do no longer form a proper protection against unauthorized use of the passenger information system. Anyone with such a railway carriage key can now gain access to the interfacing system for the passenger information system. This is highly undesirable as it may lead to disinformation that is presented to the passenger.

SUMMARY OF THE INVENTION

It is an object of the present invention to overcome the above identified problem and to provide a passenger information system that is better protected against unauthorized use while avoiding complicated centralized authorization schemes.

This object is achieved, according to a first aspect, by passenger information system for a public transport vehicle comprising one or more public compartment accessible by users of the transport vehicle and comprising a restricted compartment accessible by an operator of the transport vehicle to which users of the transport vehicle are not allowed access. The passenger information system comprises:
- one or more passenger information terminal for communicating information to the users when located in the one or more public compartment; and
- a first electronic identification device configured to exchange an electronic identification with the operator when located in the restricted compartment and to register the electronic identification with the passenger information system as a registered electronic identification; and
- an interfacing system comprising one or more inputting means for inputting information into the passenger information system and further comprising a second electronic identification device configured to receive an electronic identification from a user of the interfacing system;

and wherein the passenger information system is further arranged to authorize the inputting of information via the inputting means when the electronic identification from the user matches the registered electronic identification.

In other words, the inputting means can only be operated when a valid electronic identification is provided to the interfacing system. Such electronic identification is much safer than a mechanical lock that can be opened with a skeleton key.

Moreover, the inputting means is only operable with an electronic identification that has been registered with the passenger information system, i.e. registered from within the transport vehicle. Even more, this registration can only be done from within a restricted location on the transport vehicle, i.e. an operator must be within this restricted location to register his electronic identification with the passenger information system. Only from then on, the operator can input information into the passenger information system from an interfacing system elsewhere in a public area on the train. Therefore, any electronic key comprising an electronic identification is useless until this registration process has been performed.

The above passenger information system avoids the need for a centralized key management. In other words, any operator that enters the transport vehicle can register himself locally. Because of the specific area from where the registration must be done, the passenger information system is protected by the intrinsic security offered by the restricted compartment in the transport vehicle. Therefore, when an operator registers his electronic identification, the security offered by the restricted area is equally applicable to the complete passenger information system.

This passenger information system may for example be provided in a train, a metro, a bus or a tram.

The interfacing system may further comprise a mechanical lock unlockable by a skeleton key, preferably by a railway carriage key. Thus, the passenger information system may be combined with conventional protection mechanisms. For example, the passenger information system may be retrofitted into passenger vehicles that comprise public compartments with lockable cabinets that house the inputting means.

The first and/or second electronic identification device may for example be selected from the group consisting of:
- a keyboard,
- a cardreader,
- a wireless card reader,
- a Radio-Frequency Identification, RFID, reader,
- a Near Field Communication, NFC, reader; and a finger-print reader.

The inputting means may for example be selected from the group consisting of:
- a network interface for connecting a communication device to the passenger information system (154);
- a microphone (142);
- a telephone handset (142);
- a keyboard; and
- a touch screen.

According to an embodiment of the invention, the restricted compartment is a driver's compartment. Therefore, the operator needs to come into the driver's compartment to register his electronic identification. As the driver is always present in the driver's compartment during use of the transportation vehicle, it can be assured that registration is always supervised or checked by an authorized person.

According to an embodiment, the passenger information system is further arranged to automatically erase all registered electronic identifications each time the passenger information system is rebooted. This has the advantage that electronic identifications do not remain in the passenger information system too long because this could pose be a potential security risk. This is especially advantageous because in general most transport vehicles are powered down at least once a day.

According to an embodiment, the passenger information system is further arranged to perform the authorization temporarily. This makes sure that the inputting means become automatically unusable for an unauthorized person after use by the operator. To do so, the passenger information system may be further arranged to de-authorize the inputting of information via the inputting means after the inputting of information.

According to a second aspect, the invention relates to a public transportation vehicle comprising a passenger information system according to the first aspect.

According to a third aspect, the invention relates to a computer-implemented method for protecting access to a passenger information system installed in a public transport vehicle comprising the following steps:
- exchanging by a first electronic identification device a first electronic identification with an operator when located in a restricted compartment of the public transport vehicle; and
- registering the electronic identification in a data store for storing registered electronic identifications; and
- receiving by a second electronic identification device a second electronic identification; and wherein the second electronic identification device is part of an interfacing system; the interfacing system further comprising inputting means for inputting information into the passenger information system;
- authorizing inputting information into the passenger information system via the inputting means when the second electronic identification matches one of the registered electronic identifications in the data store.

According to a fourth aspect, the invention relates to a data processing system comprising means for carrying out the method according to the third aspect.

According to a fifth aspect, the invention relates to a computer program product comprising instructions which, when the program is executed by a computer, cause the computer to carry out the method according to the third aspect.

According to a sixth aspect, the invention relates to a computer-readable storage medium comprising instructions which, when executed by a computer, cause the computer to carry out the method according to the third aspect.

DETAILED DESCRIPTION OF EMBODIMENT(S)

Figure 1:
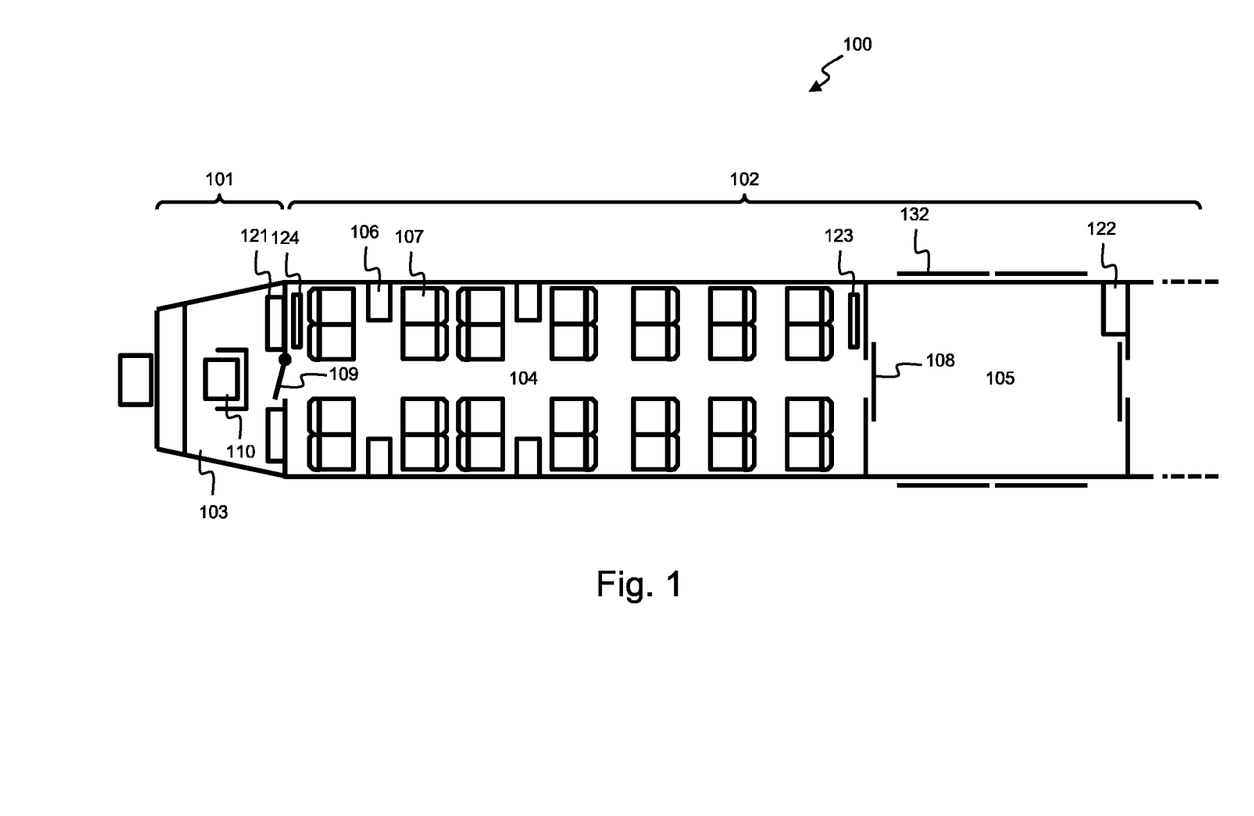
FIG. 1 illustrates a part of a train comprising a passenger information system according to an embodiment of the invention.
Figure 2:
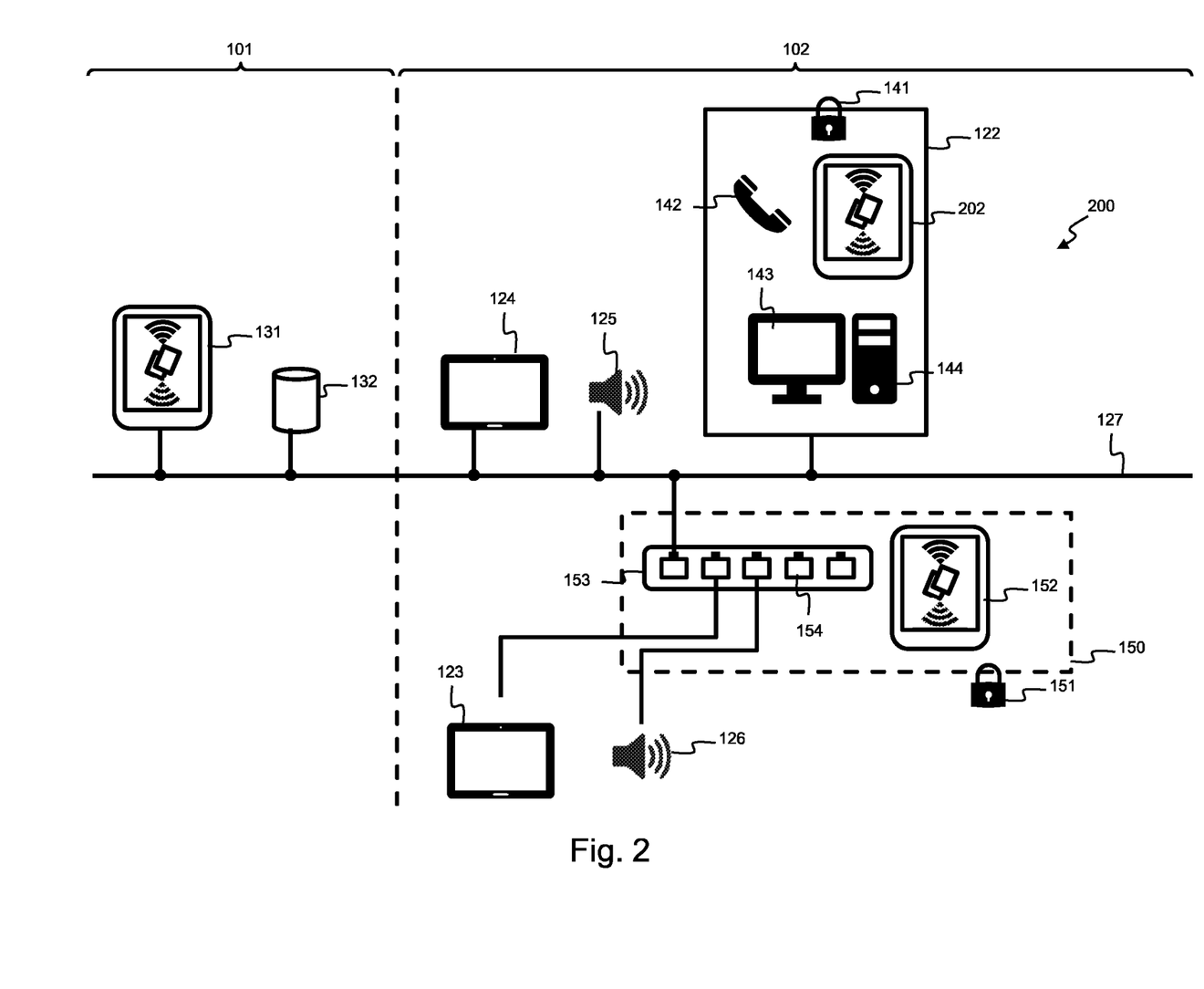
FIG. 2 illustrates interconnected components of a passenger information system according to an embodiment of the invention.

The present invention relates to a Passenger Information System, shortly PIS. FIGS. 1 and 2 illustrate a part of a train 100 with a PIS 200 according to an embodiment of the invention. Train 100 comprises a driver's compartment 103 with a driver's seat 110. Train 100 may further comprise a second driver's compartment at the opposite side. The driver's compartment 103 is part of the restricted area 101 of the train. Passengers of the train 100 are not permitted in the restricted areas. Such a restricted area is typically defined by the operating body that operates the train. A restricted area is normally labelled as such and may further be protected by a door 109. Door 109 may further comprise a lock that can be opened by a dedicated key or by a skeleton key. Other areas in the train 100 besides the driver's compartment 103 may also be labelled as a restricted area, for example a separate cabin dedicated for the guard or conductor of the train or a technical area. Besides the restricted area 101, the train 100 also comprises a public area 102. In the public area, passengers of the train 100 are allowed access when they have a valid transport ticket. The public area 102 may comprise a separate entry and exit compartment 105. This compartment 105 comprises sliding doors 132 for providing the passengers access to the train 100. Compartment 105 further comprises a second door 108 providing the passengers access to a second public compartment 104. Public compartment 104 may comprises a plurality of passenger seats 107 and tables 106.

The PIS 200 as illustrated in FIG. 2 is installed in train 100. PIS 200 may be installed in any public transport vehicle that features at least one restricted area 101 and one public area 102. This is typically the case for a metro, bus, tram, train or airplane.

The PIS 200 comprises information terminals 123-126 for outputting information to the passengers when they are in the public area 102. PIS 200 may for example comprise a screen 123, 124 for displaying travelling information in the seating area 104. PIS 200 may further comprise speakers 125, 126 for providing audible travel information to the passengers.

The PIS 200 further comprises a first electronic identification device 131. First identification device 131 is arranged to exchange an electronic identification code with a user that is present in the restricted area 101. To this respect, identification device 131 is adapted to obtain the electronic identification from the user and/or for providing the identification code to the user. PIS 200 may further comprise a data store 132 for storing the exchanged electronic identification code. In FIG. 2, the first electronic identification device 131 is shown within the restricted area 101, but it may also be arranged outside the restricted as long as the identification code can only be exchanged when the user is within the restricted area 101. An identification code is to be understood as a piece of data that can be related to the user or to an object carried by the user such that the user is identifiable by the PIS 200 information system upon presenting the identification code.

Different available systems may be used for exchanging the identification code and for the electronic identification device 131. Examples of such systems are:

- A card reader as the electronic identification device 131 located in the restricted area 101. The user then carries a card adapted to carry an electronic identification code. Upon arrival in the restricted area, the user inserts the card in the card reader upon which the electronic identification code is exchanged with the card reader. The card reader may also be a wireless card reader such that it suffices to hold the card against or near the wireless card reader. Such wireless card reader and card may for example use Radio-Frequency Identification, RFID, technology to exchange the identification code.
- The electronic identification device 131 may also correspond to a fingerprint reader installed in the restricted area 101. The electronic identification is then a digital representation of the fingerprint of the user. Therefore, when the user is in the restricted area, he has his fingerprint scanned by the fingerprint reader.
- The electronic identification device 131 may also correspond to a Near Field Communication, NFC, reader. The identification code may then be exchanged with any device or object supporting NFC such as for example a smart watch, a mobile phone, a tablet and the like.
- The electronic identification device 131 may also correspond to a keyboard located in the restricted area. In this case, the user may enter any key sequence into the keyboard as the electronic identification.

Figure 3:
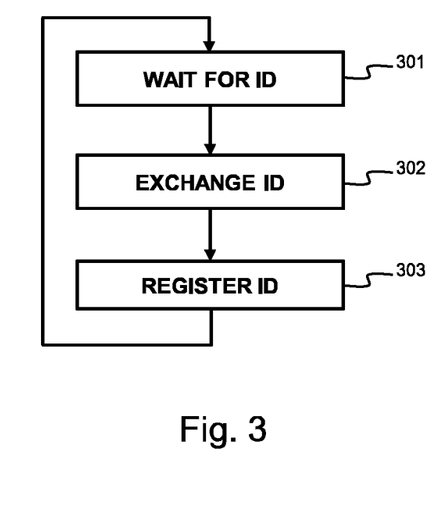
FIG. 3 illustrates steps performed by a first electronic identification device of the passenger information system according to an embodiment of the invention.

FIG. 3 illustrates steps performed when exchanging an identification code with electronic identification device 131 when the user is located in the restricted area 101. When operational, the electronic identification device 131 waits for input by a user in step 301. When a user interacts with the electronic identification device 131, the method proceeds to step 302 where the identification code is exchanged between the user or an object carried by the user and the electronic identification device 131. Exchanging the electronic identification code may comprise:

- Sending an electronic identification code from the electronic identification device 131 to the user. The electronic identification code may further be randomly generated or selected from a predefined list of electronic identification codes.
- Receiving an electronic identification code from the user directly, e.g. by keyboard input or from an object carried by the user, e.g. a card or mobile communication device. The electronic identification code may be hardcoded onto this object or generated randomly.

The method then proceeds to step 303 where the exchanged electronic identification code is stored within the Passenger Information System as a registered electronic identification.

PIS 200 further comprises one or more interfacing systems 122, 150. These systems 122, 150 are arranged for inputting information into the passenger information system 200 such that the status of the PIS can be changed or adapted.

In the example of FIGS. 1 and 2, PIS 200 comprises an interfacing system 122 located in the public area 122, more particular in the entrance compartment 105. Interfacing system 122 comprises a handset 142 as inputting means for inputting audible information into the PIS 200. This way, the operator of train 100 may speak to the passenger through the speakers 125 and 126. Interfacing system 122 may further comprise other inputting means for inputting information into PIS 200 such as for example a microphone, a keyboard for inputting information that is to be displayed on screens 123, 124 or a touch screen 143. Interfacing system 122 may further comprise any suitable computing system 144 used for processing the inputted information and exchanging data with the PIS 200. Optionally, the interfacing system 122 comprises a mechanical lock 141 for securing the other components 142, 202, 143, 144 from unauthorized access, i.e. from passengers in the public area 102. This lock may be unlockable by a skeleton key such as a railway carriage key.

Interfacing system 122 further comprises a second electronic identification device 202. This second device 202 is arranged to obtain an electronic identification code from a user that wishes to input information into the PIS 200. Second electronic identification device 202 may be similar to the first electronic identification device 131. PIS 200 is further arranged to only allow a user of the interfacing system 122 to input information into the PIS 200 when the electronic identification code received by the second electronic identification device 202 is a registered electronic identification code, i.e. an electronic identification that has already been exchanged between the first electronic identification device 131 and the user. This way, it is assured that the user of interfacing system 122 is an authorized user, i.e. a user that has been registered to the PIS 200 when located in the restricted area 102.

Figure 5:
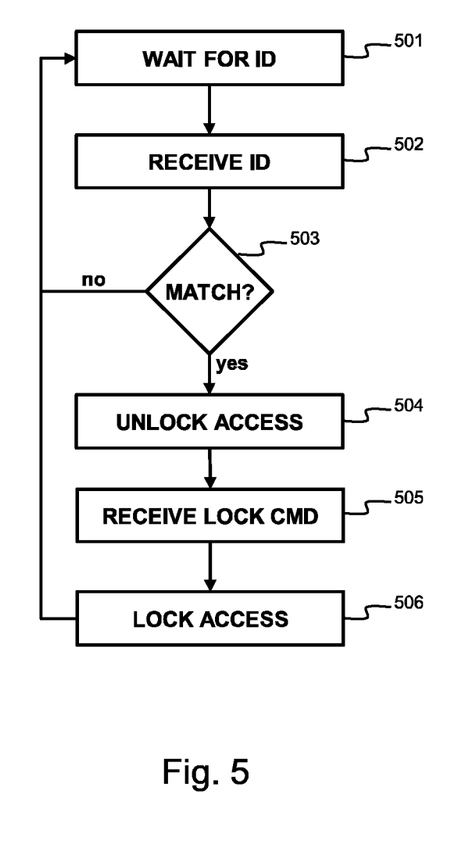
FIG. 5 illustrates steps performed by a second or third electronic identification device of the passenger information system according to an embodiment of the invention.

FIG. 5 illustrates steps performed by PIS 200 for authorizing a user to input information into the PIS 200 by the inputting means 142. When a user accesses the interfacing system 122, for example by opening lock 141, then the PIS 200 will be in a waiting state 501. Thereupon, when the user provides his electronic identification to the electronic identification device 202 the method proceeds to step 502 and receives the electronic identification. In a subsequent step 503, the PIS 200 verifies whether the received electronic identification code matches any of the stored registered identification codes, i.e. any of the codes that has been exchanged with the first electronic identification device 131 in the restricted area 102. When there is no match, the method returns to step 501 and waits for a new receival of an electronic identification. Optionally, a further message or signal may be generated for signalling the failed authorization. When there is a match, the method proceeds to step 504 and unlocks or authorizes the access to the inputting means allowing the user to input information into the PIS 200. When all information has been inputted, the user may execute a command to lock the inputting means, thereby proceeding to step 505. Thereafter the PIS 200 locks or de-authorizes the access to the inputting means in step 506. Thereafter, the method returns to step 501 where it waits for the reception of a new electronic identification. Alternatively, to receiving the locking command in step 505, the PIS 200 may also automatically de-authorize access to the inputting means. For example, PIS may de-authorize access to the inputting means after a predetermined duration. This duration may start after the last use of the inputting means or after the unlocking in step 504.

The steps of FIG. 5 have been illustrated with reference to the interfacing system 122. According to an embodiment, similar step may be performed for accessing the interfacing system 150. Interfacing system 150 comprises a networking switch 153 that connects different networking components of PIS 200 together, i.e. components 123 and 126. Networking switch 153 further comprises an empty or open networking port 154 which can be used for accessing and configuring PIS 200. Port 154 may be a dedicated configuration port through which PIS 200 can be configured or adapted. To this respect, networking switch 153 can be seen as inputting means for providing information to the PIS 200. To protect the switch 153 from unauthorized access, the interfacing system 150 further comprises a third electronic identification device 152. By performing the same steps as described with reference to FIG. 5, a user may gain access to configuration port 154 of switch 153, i.e. by first providing a registered electronic identification to the third electronic identification device 152. When the user is authorized, then PIS 200 enables port 154 on switch 153 such that the user can gain access to PIS 200, i.e. the user can make changes to PIS 200. Similar to interfacing system 122, system 150 may also comprise a mechanical lock 151 unlockable by a railway carriage key.

The above steps performed by PIS 200 with reference to FIGS. 3 and 5 may be performed on any suitable computing means that has access to the components of PIS 200 necessary for performing the authorization and de-authorization. These components comprise the first electronic device 131, a data store 132 for storing the registered electronic identifications, the inputting means 142, 153 that are to be protected and the electronic identification devices 202, 152 for receiving the electronic identifications. Preferably, all components of PIS 200 are interconnected by a communication network 127 such as an ethernet network or the like.

To limit the amount of registered electronic identifications and the duration that the identifications reside in the PIS 200, different means may be provided to erase registered identifications from data store 132 and, hence, to deregister users from the PIS 200. First, a deregistration functionality may be provided at different locations within the train 100, for example in the restricted area 101 or in the public are 102. Electronic identification devices 131, 202 and 152 may for example also be arranged for deregistering a user from the PIS 200. Second, deregistration may be performed automatically after a predefined duration, for example a certain time after the last receival of an identification or a certain time after the registration of the identification. Third, deregistration may be performed automatically upon rebooting the PIS 200, for example by using a volatile memory 132 for storing the electronic identifications.

Figure 4:
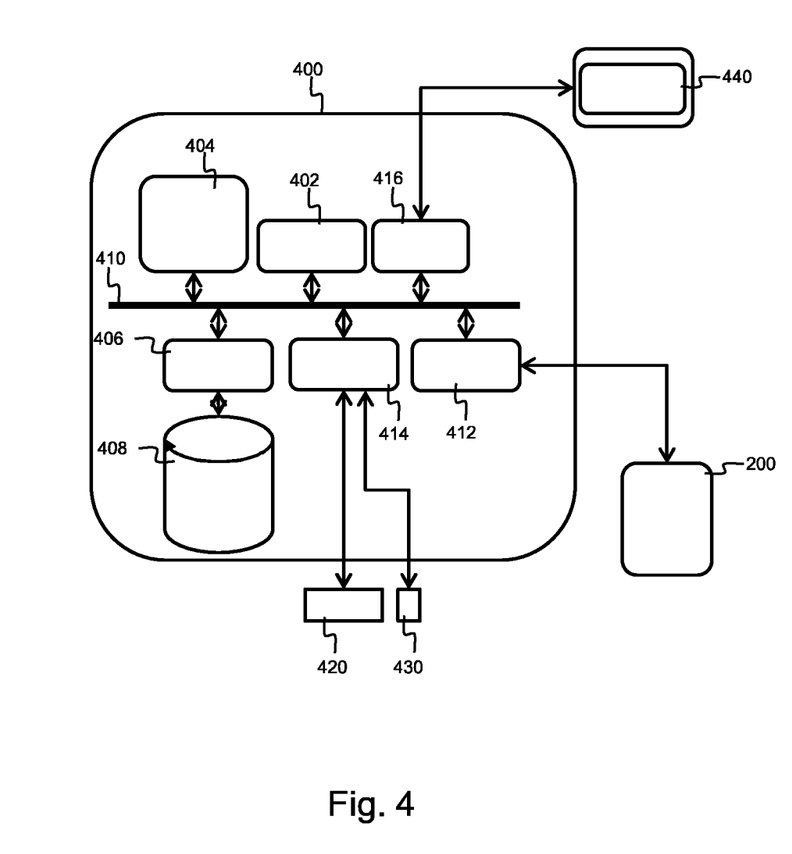
FIG. 4 illustrates a suitable computing system for performing the steps according to various embodiments of the invention.

FIG. 4 shows a suitable computing system 400 for performing steps according to the above embodiments. Computing system 400 may in general be formed as a suitable general-purpose computer and comprise a bus 410, a processor 402, a local memory 404, one or more optional input interfaces 414, one or more optional output interfaces 416, a communication interface 412, storage element interface 406 and one or more storage elements 408. Bus 410 may comprise one or more conductors that permit communication among the components of the computing system. Processor 402 may include any type of conventional processor or microprocessor that interprets and executes programming instructions. Local memory 404 may include a random-access memory, RAM, or another type of dynamic storage device that stores information and instructions for execution by processor 402 and/or a read only memory, ROM, or another type of static storage device that stores static information and instructions for use by processor 404. Input interface 414 may comprise one or more conventional mechanisms that permit an operator to input information to the computing device 400, such as a keyboard 420, a mouse 430, a pen, voice recognition and/or biometric mechanisms, etc. Output interface 416 may comprise one or more conventional mechanisms that output information to the operator, such as a display 440, a printer 450, a speaker, etc. Communication interface 412 may comprise any transceiver-like mechanism such as for example an Ethernet interface that enables computing system 400 to communicate with other devices and/or systems of the PIS 200. The communication interface 412 of computing system 400 may be connected to such another computing system by means of a local area network, LAN thereby forming network 127. Storage element interface 406 may comprise a storage interface such as for example a Serial Advanced Technology Attachment, SATA, interface or a Small Computer System Interface, SCSI, for connecting bus 410 to one or more storage elements 408, such as one or more local disks, for example SATA disk drives, and control the reading and writing of data to and/or from these storage elements 408. Although the storage elements 408 above is described as a local disk, in general any other suitable computer-readable media such as a removable magnetic disk, optical storage media such as a CD or DVD, -ROM disk, solid state drives, flash memory cards, . . . could be used.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A passenger information system for a public transport vehicle comprising one or more public compartment accessible by users of the transport vehicle and comprising a restricted compartment accessible by an operator of the transport vehicle to which users of the transport vehicle are not allowed access;
said passenger information system comprising:
one or more passenger information terminal for communicating information to the users when located in the one or more public compartment; and
a first electronic identification device configured to exchange an electronic identification with the operator when the operator is located in the restricted compartment and to register the exchanged electronic identification with the passenger information system as a registered electronic identification; and
an interfacing system, said interfacing system comprising:
one or more inputting means for inputting information into the passenger information system; and
a second electronic identification device configured to receive an electronic identification for accessing the inputting means;
wherein the passenger information system is further arranged to authorize the inputting of information via said inputting means when the electronic identification received by the second electronic identification device matches the registered electronic identification.

2. The passenger information system according to claim 1 wherein the public transport vehicle is a train, a metro, a bus or a tram.

3. The passenger information system according to claim 1 wherein the interfacing system further comprises a mechanical lock unlockable by a skeleton key.

4. The passenger information system according to claim 1 wherein the first and second electronic identification device comprises at least one of the group of:
a keyboard,
a cardreader,
a wireless card reader,
a Radio-Frequency Identification, RFID, reader,
a Near Field Communication, NFC, reader; and
a finger-print reader.

5. The passenger information system according to claim 1 wherein the inputting means comprises at least one of the group of:
a network interface for connecting a communication device to the passenger information system;
a microphone;
a telephone handset;
a keyboard; and
a touch screen.

6. The passenger information system according to claim 1 wherein the restricted compartment is a driver's compartment.

7. The passenger information system according to claim 1 further configured to automatically erase all registered electronic identifications each time the passenger information system is rebooted.

8. The passenger information system according to claim 1 further arranged to perform the authorization temporarily.

9. The passenger information system according to claim 8 further arranged to de-authorize the inputting of information via said inputting means after the inputting of information.

10. A public transportation vehicle comprising a passenger information system according to claim 1.

11. A computer-implemented method for protecting access to a passenger information system installed in a public transport vehicle comprising the following steps:
exchanging by a first electronic identification device a first electronic identification with an operator when the operator is located in a restricted compartment of the public transport vehicle; and
registering the exchanged first electronic identification in a data store for storing registered electronic identifications; and
receiving by a second electronic identification device a second electronic identification for accessing an inputting means for inputting information into the passenger information system; and wherein the second electronic identification device and the inputting means are part of an interfacing system;
authorizing inputting information into the passenger information system via the inputting means when the second electronic identification received by the second electronic identification device matches one of the registered electronic identifications in the data store.

12. A data processing system comprising means for carrying out the method of claim 11.

13. A non-transitory computer-readable storage medium comprising instructions which, when executed by a computer, cause the computer to carry out the method of claim 11.

14. A passenger information system for a public transport vehicle comprising one or more public compartment accessible by users of the transport vehicle and comprising a restricted compartment accessible by an operator of the transport vehicle to which users of the transport vehicle are not allowed access;
said passenger information system comprising:
one or more passenger information terminal for communicating information to the users when located in the one or more public compartment; and
a first electronic identification device configured to exchange an electronic identification with the operator when located in the restricted compartment and to register the electronic identification with the passenger information system as a registered electronic identification; and
an interfacing system comprising one or more inputting means for inputting information into the passenger information system; and
comprising a second electronic identification device configured to receive an electronic identification from a user of the interfacing system;
wherein the passenger information system is arranged to authorize the inputting of information via said inputting means when the electronic identification from the user matches the registered electronic identification and to de-authorize the inputting of information via said inputting means after the inputting of information.

* * * * *